July 6, 1937.                F. J. MARTIN                2,085,813
                             LICENSE PLATE
                           Filed May 18, 1936
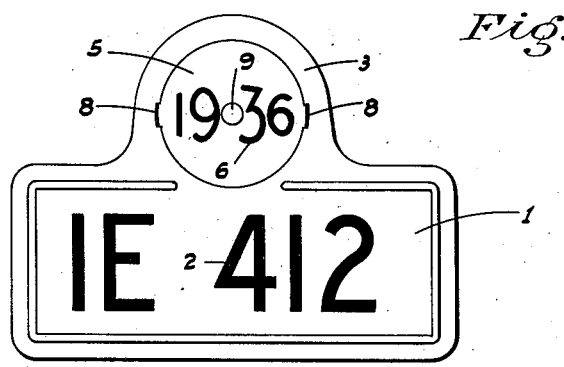
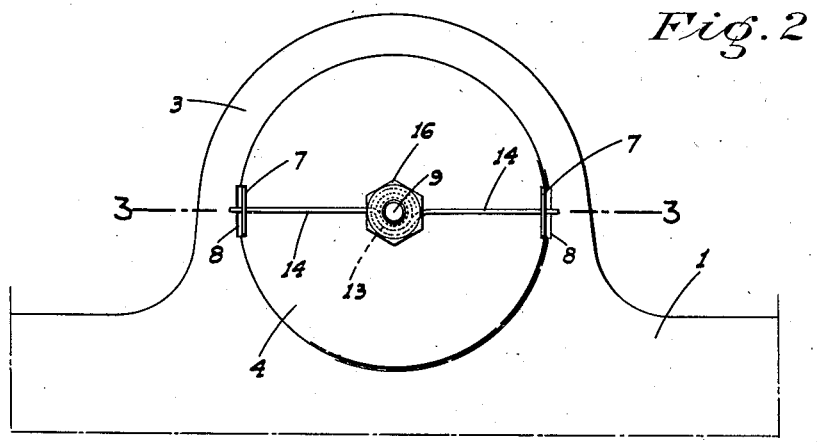
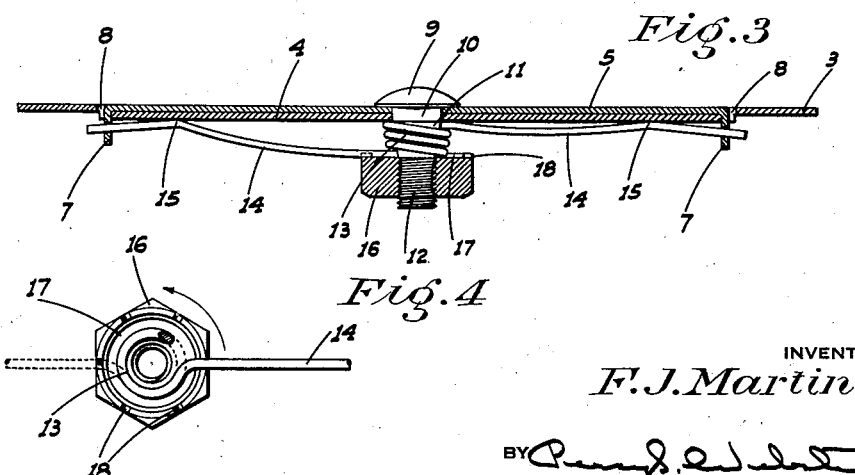
INVENTOR
F. J. Martin
BY
ATTORNEY Patented July 6, 1937

2,085,813

UNITED STATES PATENT OFFICE 2,085,813

LICENSE PLATE

Frederick J. Martin, Oakdale, Calif.

Application May 18, 1936, Serial No. 80,249

4 Claims. (Cl. 40—125)

This invention relates generally to a license plate for a motor vehicle and in particular relates to a license plate assembly including a separate auxiliary plate preferably of disc form which bears the year indicating numerals.

The principal object of my invention is to provide such a license plate assembly adapted for mounting on a vehicle and arranged so that the auxiliary plate bearing the year indicating numerals may be easily and readily removed and a new one substituted each year without the necessity of removing the remainder of the assembly from the vehicle. Not only does such an assembly do away with the difficult task of changing the entire license plate but it also materially reduces the governmental cost of manufacturing license plates and administration in connection with the distribution thereof. Once a vehicle is licensed and the license plate assembly attached it is only necessary to change the year indicating auxiliary plate at the beginning of each year.

An additional object of my invention is to provide a positive and yet readily detachable securing means for the year indicating auxiliary plate.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front elevation of my improved license plate assembly.

Figure 2 is an enlarged fragmentary back elevation illustrating the auxiliary plate securing means.

Figure 3 is a sectional view on line 3—3 of Fig. 2.

Figure 4 is a bottom face view of the lock nut showing the adjacent turn of the spring engaged therewith.

Referring now more particularly to the characters of reference on the drawing, the license plate assembly comprises a main plate having a substantially rectangular body 1, upon which is impressed or imprinted the license numerals 2, and a relatively short extension 3 projecting from one edge thereof.

The face of this extension 3 is depressed, as at 4, to form a recess for the reception of an auxiliary plate 5 upon which appears the year indicating numerals 6. The recess is of such a depth and size as to receive the auxiliary plate 5 in snug engagement about its periphery and with its face flush with the face of body 1.

Ears 7 extend at right angles from the auxiliary plate 5 of opposite sides thereof; said ears projecting through slots 8 cut in the bottom of the recessed portion 4 of the extension.

A bolt 9 having a square shank 10 adjacent the head extends through square matching holes in the auxiliary plate 5 and recessed portion 4 of the extension; said bolt tapering, as at 11, from the square portion of the shank to the threaded portion 12 thereof for the purpose hereinafter described.

A compression spring 13 is coiled about the tapered portion 11 of the shank and projects at its ends in the form of fingers 14 which are bent down to frictionally engage intermediate their ends against the back of extension 3, as at 15, and are then bent up to their outer ends to project through holes in the ears 7. This spring 13 is held in place on the shank of bolt 9 by means of nut 16. This nut is recessed on its inner face to receive the adjacent coil of the spring 13; radial notches 18 being cut from the recess to the outer edges of the nut to receive the adjacent finger 14 therein.

In use, the body 1 of the plate and the extension 3 which is integral therewith are permanently mounted on the motor vehicle. The year indicating auxiliary plate is then placed in the recess in the extension with ears 7 projecting through slots 8 and with bolt 9 in place.

Spring 13 is then slipped over the tapered portion 11 of the shank of the bolt; the taper tending to hold the spring in place. The ends of fingers 14 are then inserted through the holes in ears 7 and the nut threaded on the bolt and tightened. As the nut is tightened, fingers 14 are moved inward adjacent the nut and outward at their ends due to the fact that the points of engagement 15 act as fulcrums. This positively secures the auxiliary plate 5 in the recess and prevents rattling, etc.

Also, as the nut is tightened the finger 14, which extends from the adjacent coil of the spring, engages in one of the radial notches 17 and serves to lock the nut against rotation thereby preventing unthreading of same due to vibration.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A license plate assembly comprising a main plate having spaced slots cut therethrough, and an auxiliary plate disposed against the face of the main plate, ears formed on the auxiliary plate and extending through said slots, the ears having openings therethrough, a spring element extending between the ears and engaging in the openings, and means included with the element to cause the element to exert a constant yieldable tension on the ears in a direction to maintain the auxiliary plate clamped against the main plate.

2. A license plate assembly comprising a main plate having spaced slots cut therethrough, an auxiliary plate disposed against the face of the main plate, ears formed on the auxiliary plate and having openings therein, said ears extending through said slots, a bolt projecting from the front of the auxiliary plate through the main and auxiliary plates, a compression spring coiled about the shank of the bolt behind the main plate, the ends of the spring being extended in opposite directions as fingers which engage at their ends in the openings in the ears, said fingers being bent intermediate their ends to frictionally engage against the back of the main plate and a nut threaded on the shank of the bolt to tighten the spring.

3. A device as in claim 2 in which the nut is recessed to engage the adjacent turn of the spring, said nut having radial notches cut therein from the recess to the outer edges thereof to receive the finger which extends from the end of said turn of the spring.

4. A license plate assembly comprising a main plate having spaced slots cut therethrough, an auxiliary plate disposed against the outer face of the main plate, ears on the auxiliary plate projecting through the slots, the ears having openings therethrough inwardly of the main plate, an element extending between the ears with its ends projecting through the ear openings, and resilient means included with the element to cause the element to exert a constant yieldable tension on the ears in a direction to hold the auxiliary plate in firm contact with the main plate.

FREDERICK J. MARTIN.